(12) United States Patent
Kivits

(10) Patent No.: US 7,978,589 B1
(45) Date of Patent: Jul. 12, 2011

(54) SYSTEM AND METHOD FOR VERIFYING WRITE PERFORMANCE DURING OPTICAL RECORDING

(75) Inventor: Peter J. Kivits, Waalre (NL)

(73) Assignee: Marvell International Ltd., Hamilton (BM)

( * ) Notice: Subject to any disclaimer, the term of this patent is extended or adjusted under 35 U.S.C. 154(b) by 270 days.

(21) Appl. No.: 12/171,563

(22) Filed: Jul. 11, 2008

Related U.S. Application Data

(60) Provisional application No. 60/954,152, filed on Aug. 6, 2007, provisional application No. 61/033,839, filed on Mar. 5, 2008.

(51) Int. Cl.
*G11B 7/00* (2006.01)

(52) U.S. Cl. ........... 369/124.03; 369/124.02; 369/44.38; 369/44.37; 369/53.27; 369/53.36

(58) Field of Classification Search ........................ None
See application file for complete search history.

(56) References Cited

U.S. PATENT DOCUMENTS

| | | | | | |
|---|---|---|---|---|---|
| 5,909,418 | A | * | 6/1999 | Noda et al. ................. | 369/53.36 |
| 7,301,866 | B2 | * | 11/2007 | Kuroda et al. ............. | 369/47.27 |

* cited by examiner

*Primary Examiner* — Joseph Haley

(57) ABSTRACT

A write analysis system is described for an optical drive, where the optical drive includes an optical storage medium. The write analysis system includes a filter that receives a reflected signal that is based on a reflection of a diffracted laser beam. The reflection of the diffracted laser beam includes a reflection of a first write signal. The filter generates a filtered signal by filtering the first write signal from the diffracted laser beam. The system also includes a read-back module that receives the filtered signal and that compares the filtered signal to a second write signal that was written to the optical storage medium prior to the first write signal.

12 Claims, 9 Drawing Sheets

SYSTEM AND METHOD FOR VERIFYING WRITE PERFORMANCE DURING OPTICAL RECORDING

CROSS-REFERENCE TO RELATED APPLICATIONS

This application claims the benefit of U.S. Provisional Application Nos. 60/954,152, filed on Aug. 6, 2007 and 61/033,839, filed on Mar. 5, 2008. The disclosures of the above applications are incorporated herein by reference in their entirety.

FIELD

The subject matter of the present disclosure relates generally to data storage, and more particularly to optical recording devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Optical recording devices are used to record information, such as music, movies, pictures, data, etc., on recordable media. Examples of recordable media are compact discs (CDs), digital versatile discs (DVDs), high density/high definition DVDs and Blu-ray Discs (BDs). In order to record such information, a recording device tracks the location of a laser beam on the recordable media.

Referring to FIGS. 1A-1B, a partial cross-sectional views of examples of recordable mediums 10-A, 10-B are illustrated. The recordable mediums 10-A, 10-B have lands 12 and grooves 14, which are formed on one or more recording layers 16 of one or more main substrates 18. The main substrates 18 may be adhered via an adhesive layer 20 to dummy substrates 22, as shown.

The lands 12 and grooves 14 refer to physical structures of the recording layer 16 that are adjacent each other but that have different associated depths. For example, the grooves 14 have a larger associated depth than the lands 12. Sample land depths $D_1$ and sample groove depths $D_2$ are shown. The depths may be measured relative to a disk outer surface 24 and are equal to a fraction of optical wavelength of the laser beam. The lands 12 and grooves 14 provide servo information for positioning of a laser beam spot on a disc. The lands 12 and grooves 14 also provide reflected beam signal modulation that is detected and used for tracking.

Standards, such as DVD+/−R and DVD+/−RW, require recording only over grooves. An alternative standard, referred to as DVD-RAM, requires recording over both land and groove structures. In DVD+/−R and DVD+/−RW recording, the lands 12 and grooves 14 typically form a continuous spiral. In DVD-RAM recording, the lands 12 alternate with the grooves 14 to form a continuous spiral.

Referring to FIG. 2, a sample optical DVD drive system 50 is illustrated that includes a laser source 52, such as a laser diode, that emits a laser beam 54. The laser source 52 may be part of an optical read/write assembly (ORW) 56. The ORW 56 includes a collimator lens 58, a polarizing beam splitter 60, a quarter wave plate 62, and an objective lens 64. The laser beam 54 is collimated by the collimator lens 58 and passed through the polarizing beam splitter 60. The laser beam 54 is received by the quarter wave plate 62 from the beam splitter 60 and is focused via the objective lens 64. The laser beam 54 may be radially displaced across tracks of the optical storage medium 68 through movement of the ORW 56 via a sled motor 66. The laser beam 54 is moved while the optical storage medium 68 is rotated about a spindle axis 69. The laser beam 54 is shaped and focused to form a spot over the land/groove structures of an optical storage medium 68 via lens actuators 70.

The light from the laser beam 54 reflects off the optical storage medium 68 and is thus directed back into the ORW 56. The reflected light, represented by dashed line 72, is redirected by the beam splitter 60. An astigmatic focus lens 76 focuses the reflected light into a spot over a photo-detector integrated circuit (PDIC) 74. Although not shown, additional photo-detectors may be used to detect other diffracted light beams, which are also not shown.

SUMMARY

A write analysis system is described for an optical drive, where the optical drive includes an optical storage medium. The write analysis system includes a filter that receives a reflected signal that is based on a reflection of a diffracted laser beam. The reflection of the diffracted laser beam includes a reflection of a first write signal. The filter generates a filtered signal by filtering the first write signal from the diffracted laser beam. The system also includes a read-back module that receives the filtered signal and that compares the filtered signal to a second write signal that was written to the optical storage medium prior to the first write signal.

In other features, an optical read/write assembly (ORW) includes a laser that emits a laser beam. The ORW diffracts the laser beam into multiple diffracted laser beams including the diffracted laser beam. The multiple diffracted laser beams provide respective diffracted spots on the optical storage medium. The diffracted spots include at least a first spot and a second spot. The first spot has a greater intensity than the second spot. The ORW writes to the optical storage medium at a location of the first spot on the optical storage medium based on the first write signal. The ORW further includes a focus lens that focuses reflected light from the first and second spots onto first and second sensors, respectively. The second sensor provides the reflected signal based on the second spot. The first and second sensors include photodiodes.

In other features, a location of the second spot on the optical storage medium substantially corresponds to a previous location of the first spot on the optical storage medium. The laser beam wrote the second write signal to the previous location of the first spot. The second write signal includes at least one of data to be written, location of the data to be written and a physical dimension of the data to be written with respect to the optical storage medium. The optical storage medium includes X tracks. The location of the first spot is within a first of the X tracks, where X is an integer greater than 1. The previous location of the first spot is within at least one of the first of the X tracks and a second of the X tracks. The filter includes one of a high-pass filter and a band-pass filter.

In other features, the system includes memory and a memory control module. The memory stores data from previous write operations to the optical storage medium. The data includes the second write signal. The memory control module expunges data from the memory based on an amount the data has been stored in the memory. The system also includes an interrupt module that interrupts writing operations to the optical storage medium by comparing characteristics of the filtered signal and the second write signal. The characteristics include at least one of presence or absence of data on the optical storage medium, a size of the data on the optical storage medium, and a placement of data on the optical storage medium. The optical storage medium includes at least one of a compact disc, a digital versatile/video disc, a high definition optical disc.

In other features, a write analysis system is disclosed for an optical drive, the optical drive including an optical storage medium. The write analysis system includes a read-back module. The read-back module receives a first reflected signal that is based on a reflection of a first laser beam and a second reflected signal that is based on a reflection of a second laser beam. The reflection of the first laser beam includes a reflection of a first write signal. The read-back module compares the second reflected signal to a second write signal that was written to the optical storage medium prior to the first write signal. The system also includes an interrupt module that interrupts writing operations to the optical storage medium by comparing characteristics of the second reflected signal and the second write signal.

In other features, the system includes an optical read/write assembly (ORW) that includes a first laser that emits the first laser beam and a second laser that emits the second laser beam. The ORW diffracts the first laser beam into multiple diffracted laser beams including the reflection of the first laser beam. The multiple diffracted laser beams provide respective diffracted spots on the optical storage medium. The diffracted spots include at least a first spot and a second spot. The first spot has a greater intensity than the second spot. The ORW writes to the optical storage medium at a location the first spot on the optical storage medium based on the first write signal. The location corresponds to a first track on the optical storage medium. The ORW directs the second laser to provide a third spot on the optical storage medium.

In other features, the third spot corresponds to a second track on the optical storage medium that was written prior to the first track. The ORW further includes first, second and third sensors that receive light reflected from the first, second and third spots, respectively. The first sensor provides the first reflected signal and the third sensor provides the second reflected signal. The first and second sensors include photodiodes. The system also includes memory and a memory control module. The memory stores data from previous write operations to the optical storage medium. The memory control module expunges data from the memory based on an amount the data has been stored in the memory. The characteristics include at least one of presence or absence of data on the optical storage medium, a size of the data on the optical storage medium, and a placement of data on the optical storage medium. The optical storage medium includes at least one of a compact disc, a digital versatile/video disc, a high definition optical disc.

In other features, a method is disclosed for analyzing data written to an optical drive, the optical drive including an optical storage medium. The method includes receiving a reflected signal that is based on a reflection of a diffracted laser beam, where the reflection of the diffracted laser beam includes a reflection of a first write signal. The method also includes generating a filtered signal by filtering the first write signal from the diffracted laser beam. The method also includes comparing the filtered signal to a second write signal that was written to the optical storage medium prior to the first write signal.

In other features, the method includes emitting a laser beam from a laser of an optical read/write assembly (ORW). The method also includes diffracting the laser beam into multiple diffracted laser beams including the diffracted laser beam. The method also includes providing respective diffracted spots on the optical storage medium from the multiple diffracted laser beams. The diffracted spots include at least a first spot and a second spot. The first spot has a greater intensity than the second spot. The method also includes writing to the optical storage medium at a location of the first spot on the optical storage medium based on the first write signal.

In other features, the method includes focusing reflected light from the first and second spots onto first and second sensors, respectively. The method also includes providing the reflected signal based on the second spot from the second sensor. The first and second sensors include photodiodes. A location of the second spot on the optical storage medium substantially corresponds to a previous location of the first spot on the optical storage medium. The laser beam wrote the second write signal to the previous location of the first spot. The second write signal includes at least one of data to be written, location of the data to be written and a physical dimension of the data to be written with respect to the optical storage medium.

In other features, the optical storage medium includes X tracks. The location of the first spot is within a first of the X tracks, where X is an integer greater than 1. The previous location of the first spot is within at least one of the first of the X tracks and a second of the X tracks. The filter includes one of a high-pass filter and a band-pass filter. The method also includes storing data from previous write operations to the optical storage medium. The data includes the second write signal. The method also includes expunging data from the memory based on an amount the data has been stored in the memory.

In other features, the method includes interrupting writing operations to the optical storage medium based on comparing characteristics of the filtered signal and the second write signal. The characteristics include at least one of presence or absence of data on the optical storage medium, a size of the data on the optical storage medium, and a placement of data on the optical storage medium. The optical storage medium includes at least one of a compact disc, a digital versatile/video disc, a high definition optical disc.

In other features, a method is disclosed for analyzing data written to an optical drive, the optical drive including an optical storage medium. The method includes receiving a first reflected signal that is based on a reflection of a first laser beam. The reflection of the first laser beam includes a reflection of a first write signal. The method also includes receiving a second reflected signal that is based on a reflection of a second laser beam. The method also includes comparing the second reflected signal to a second write signal that was written to the optical storage medium prior to the first write signal.

In other features, the method includes emitting the first and second laser beams from first and second lasers, respectively, of an optical read/write assembly (ORW). The method also includes diffracting the first laser beam into multiple diffracted laser beams including the reflection of the first laser beam. The method also includes providing respective diffracted spots on the optical storage medium from the multiple diffracted laser beams. The diffracted spots include at least a first spot and a second spot. The first spot has a greater intensity than the second spot. The method also includes writing to the optical storage medium at a location the first spot on the optical storage medium based on the first write signal. The location corresponds to a first track on the optical storage medium.

In other features, the method includes directing the second laser to provide a third spot on the optical storage medium. The third spot corresponds to a second track on the optical storage medium that was written prior to the first track. The method also includes storing data from previous write operations to the optical storage medium. The method also includes expunging data from the memory based on an amount the data has been stored in the memory. The characteristics include at least one of presence or absence of data on the optical storage medium, a size of the data on the optical storage medium, and a placement of data on the optical storage medium.

In other features, a write analysis system is disclosed for an optical drive, the optical drive including an optical storage medium. The write analysis system includes read-back means for receiving a first reflected signal. The first reflected signal is based on a reflection of a first laser beam. The read-back means also receives a second reflected signal that is based on a reflection of a second laser beam. The reflection of the first laser beam includes a reflection of a first write signal. The read-back means compares the second reflected signal to a second write signal that was written to the optical storage medium prior to the first write signal. The system also includes interrupt means for interrupting writing operations to the optical storage medium by comparing characteristics of the second reflected signal and the second write signal.

In other features, the system includes an optical read/write assembly (ORW) that includes first light emitting means for emitting the first laser beam and second light emitting means for emitting the second laser beam. Only the reflection of the first laser beam includes the reflection of the write signal. The ORW diffracts the first laser beam into multiple diffracted laser beams including the reflection of the first laser beam. The multiple diffracted laser beams provide respective diffracted spots on the optical storage medium. The diffracted spots include at least a first spot and a second spot. The first spot has a greater intensity than the second spot. The ORW writes to the optical storage medium at a location the first spot on the optical storage medium based on the first write signal. The location corresponds to a first track on the optical storage medium. The ORW directs the second laser to provide a third spot on the optical storage medium.

In other features, the third spot corresponds to a second track on the optical storage medium that was written prior to the first track. The ORW further includes first, second and third sensing means for receiving light reflected from the first, second and third spots, respectively. The first sensing means provides the first reflected signal and the third sensing means provides the second reflected signal. The first and second sensing means include photodiodes. The system also includes means for storing data and memory control means for controlling the means for storing data. The means for storing data stores data from previous write operations to the optical storage medium. The memory control means expunges data from the memory based on an amount the data has been stored in the means for storing data. The characteristics include at least one of presence or absence of data on the optical storage medium, a size of the data on the optical storage medium, and a placement of data on the optical storage medium. The optical storage medium includes at least one of a compact disc, a digital versatile/video disc, a high definition optical disc.

In other features, a write analysis system is described for an optical drive, where the optical drive includes an optical storage medium. The write analysis system includes filter means for receiving a reflected signal that is based on a reflection of a diffracted laser beam. The reflection of the diffracted laser beam includes a reflection of a first write signal. The filter means generates a filtered signal by filtering the first write signal from the diffracted laser beam. The system also includes read-back means for receiving the filtered signal and for comparing the filtered signal to a second write signal that was written to the optical storage medium prior to the first write signal.

In other features, an optical read/write assembly (ORW) includes light emitting means for emitting a laser beam. The ORW diffracts the laser beam into multiple diffracted laser beams including the diffracted laser beam. The multiple diffracted laser beams provide respective diffracted spots on the optical storage medium. The diffracted spots include at least a first spot and a second spot. The first spot has a greater intensity than the second spot. The ORW writes to the optical storage medium at a location of the first spot on the optical storage medium based on the first write signal. The ORW further includes a focus lens that focuses reflected light from the first and second spots onto first and second sensing means for sensing, respectively. The second sensing means provides the reflected signal based on the second spot. The first and second sensing means include photodiodes.

In other features, a location of the second spot on the optical storage medium substantially corresponds to a previous location of the first spot on the optical storage medium. The laser beam wrote the second write signal to the previous location of the first spot. The second write signal includes at least one of data to be written, location of the data to be written and a physical dimension of the data to be written with respect to the optical storage medium. The optical storage medium includes X tracks. The location of the first spot is within a first of the X tracks, where X is an integer greater than 1. The previous location of the first spot is within at least one of the first of the X tracks and a second of the X tracks. The filter means includes one of a high-pass filter and a band-pass filter.

In other features, the system includes means for storing data and memory control means for controlling the means for storing data. The means for storing data stores data from previous write operations to the optical storage medium. The data includes the second write signal. The memory control means expunges data from the means for storing data based on an amount the data has been stored in the means for storing data. The system also includes interrupt means for interrupting writing operations to the optical storage medium by comparing characteristics of the filtered signal and the second write signal. The characteristics include at least one of presence or absence of data on the optical storage medium, a size of the data on the optical storage medium, and a placement of data on the optical storage medium. The optical storage medium includes at least one of a compact disc, a digital versatile/video disc, a high definition optical disc.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
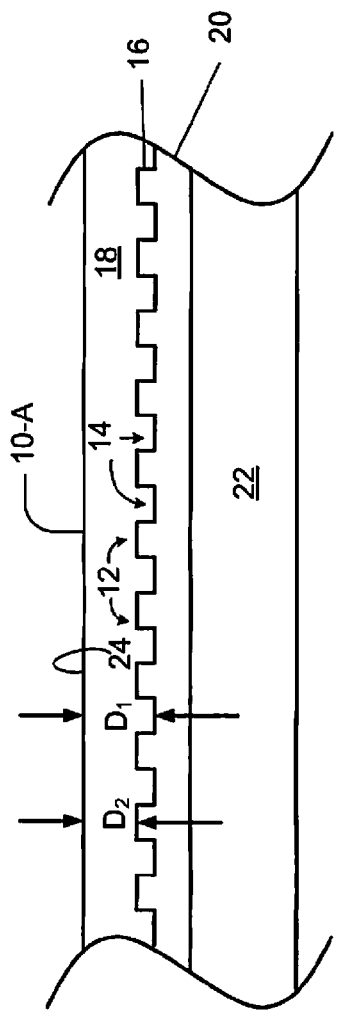
FIGS. 1A-1B are partial cross-sectional views of recording mediums according to the prior art.
Figure 1B:
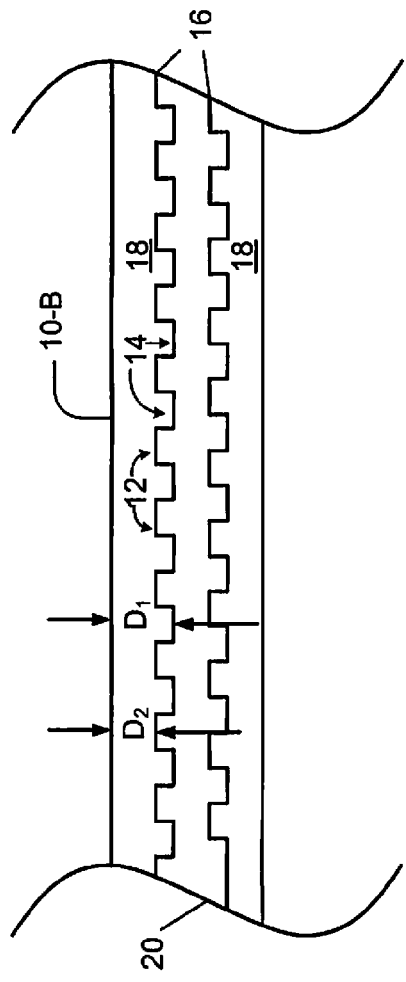
Figure 2:
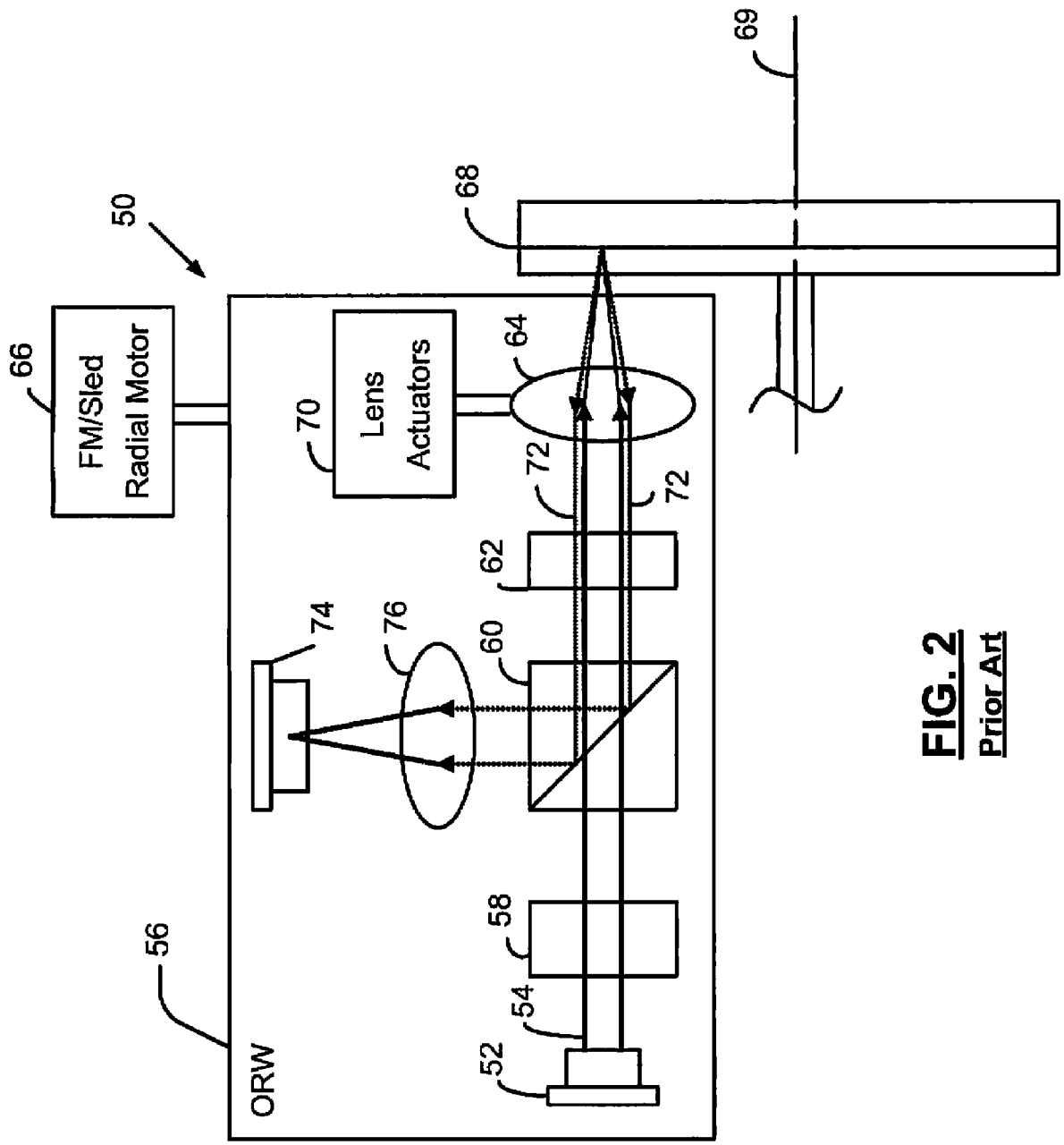
FIG. 2 is a functional block diagram of an optical drive system according to the prior art.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

As used herein, the phrase at least one of A, B, and C should be construed to mean a logical (A or B or C), using a non-exclusive logical or. A software module or module that is software based may refer to a set or series of software code, which are used to perform one or more tasks. It should be understood that steps within a method may be executed in different order without altering the principles of the present disclosure.

The present disclosure describes a data storage system including an optical recording device, such as a digital versatile disk (DVD) drive. The DVD drive uses a center laser spot of a diffracted laser beam to write and read data from an optical recording medium, such as a disk. The DVD drive diffracts the laser beam into multiple diffracted beams that provide diffracted spots that include the center spot and satellite spots. The satellite spots are a predetermined distance from the center spot. During a write operation, the DVD drive may aim the center spot at track N. First and second satellite spots may be aimed between two tracks, and/or the same track. For example, the first and second satellite spots may be aimed at least partially at track N−1 (i.e. written track) and at least partially at N+1 (i.e. not yet written track), respectively. Further, a second laser beam may be directed over the previously written track N−1 at a secondary laser spot.

The DVD drive writes data to track N and uses the satellite spots to servo the laser to track N. The DVD drive may also include a write analysis module that uses data detected from the first satellite spot and/or the secondary laser spot to monitor quality of the written data. Previous DVD drives frequently halted writing operations to analyze and/or determine quality of written data, whereas the DVD drive of the present disclosure monitors the data without frequently halting writing operations.

Figure 3:
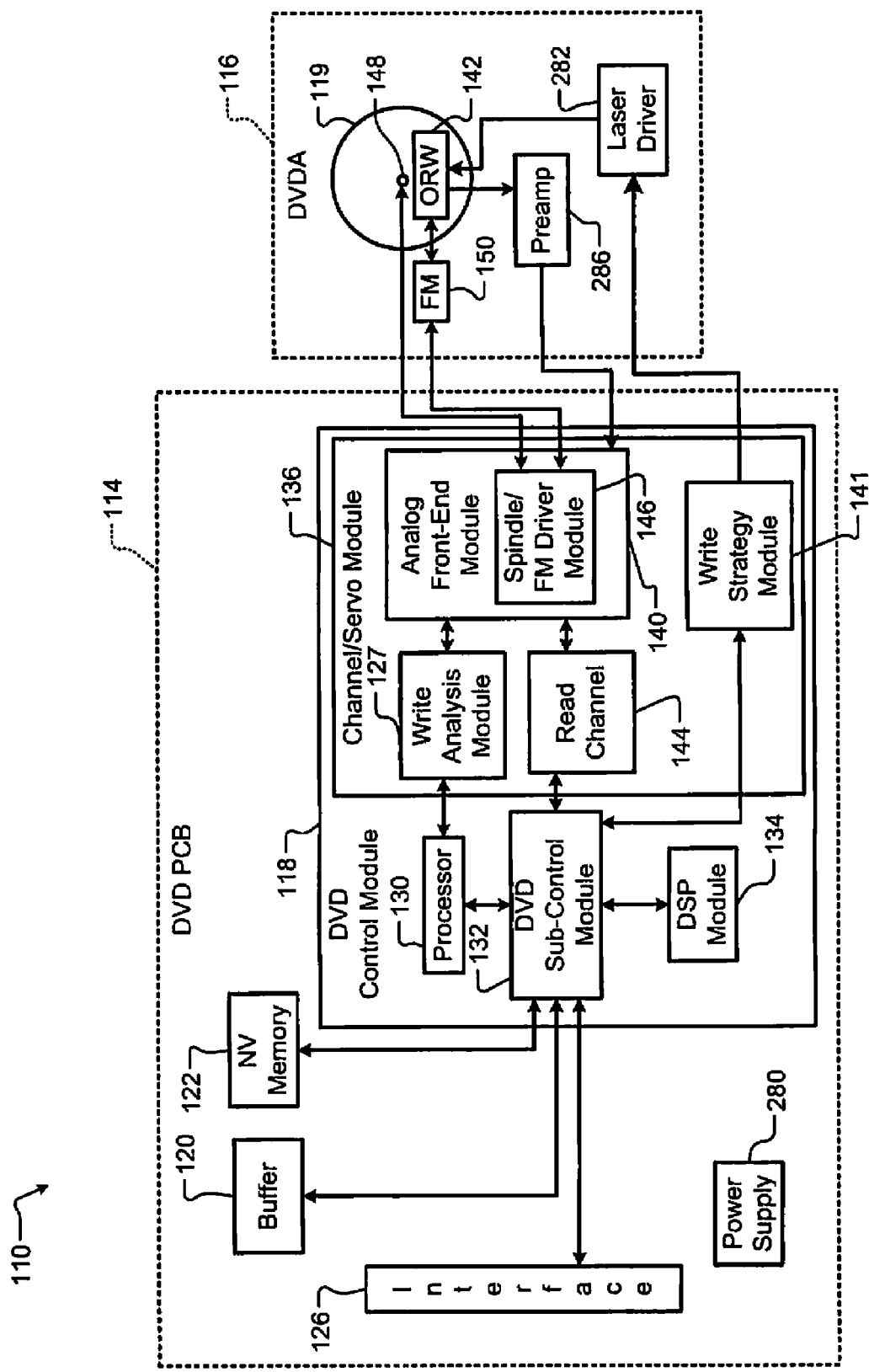
FIG. 3 is a functional block diagram of an optical drive system according to the present disclosure.

Referring to FIG. 3, an exemplary DVD drive system 110 is illustrated. Although the following embodiments are described primarily with respect to a DVD drive, they may be implemented on a CD drive or other optical data storage medium. The DVD drive system 110 includes a DVD printed circuit board (PCB) 114 and a DVD assembly (DVDA) 116 that writes/reads data from an optical storage medium 119. The DVD PCB 114 includes a DVD control module 118, a buffer 120, nonvolatile memory 122, and an input/output (I/O) interface 126.

The DVD control module 118 controls operation of the DVDA 116 and may include a write analysis module 127 and a processor 130. During write and read operations, the processor 130 may encode, decode, filter, and/or format read data. A digital signal processor (DSP) module 134 may receive and further process the read data. Also during write operations, the write analysis module 127 may analyze and determine the quality of the data as the data is written, without halting the optical storage medium 119.

The DVD control module 118 may store data related to the control and operation of the DVD system 110 in the buffer 120 and/or the nonvolatile memory 122. The buffer 120 may include dynamic random access memory (DRAM), synchronous DRAM (SDRAM), etc. The nonvolatile memory 122 may include flash memory (including NAND and NOR flash memory), phase change memory, magnetic random access memory (RAM), or multi-state memory, in which each memory cell has more than two states. The DVD PCB 114 also includes a power supply 280.

The DVD control module 118 may also include a DVD sub-control module 132 and a channel/servo module 136, any or all of which may be combined into a single module. The DVD sub-control module 132 controls operation of the channel/servo module 136 and may communicate with an external device via the I/O interface 126. The external device may include a computer, a multimedia device, a mobile computing device, etc. The I/O interface 126 may include wireline and/or wireless communication links.

The channel/servo module 136 includes an analog front-end module 140 that communicates with the DVDA 116, and also includes a write strategy module 141. The analog front-end module 140 controls operation of and receives read data from an optical read/write assembly (ORW) 142 of the DVDA 116. A read channel 144 receives and forwards the read data to the DVD sub-control module 132. A spindle/FM driver module 146 of the analog front-end module 140 controls operation of a spindle motor 148 and a feed motor 150 of the DVDA 116.

Figure 4A:
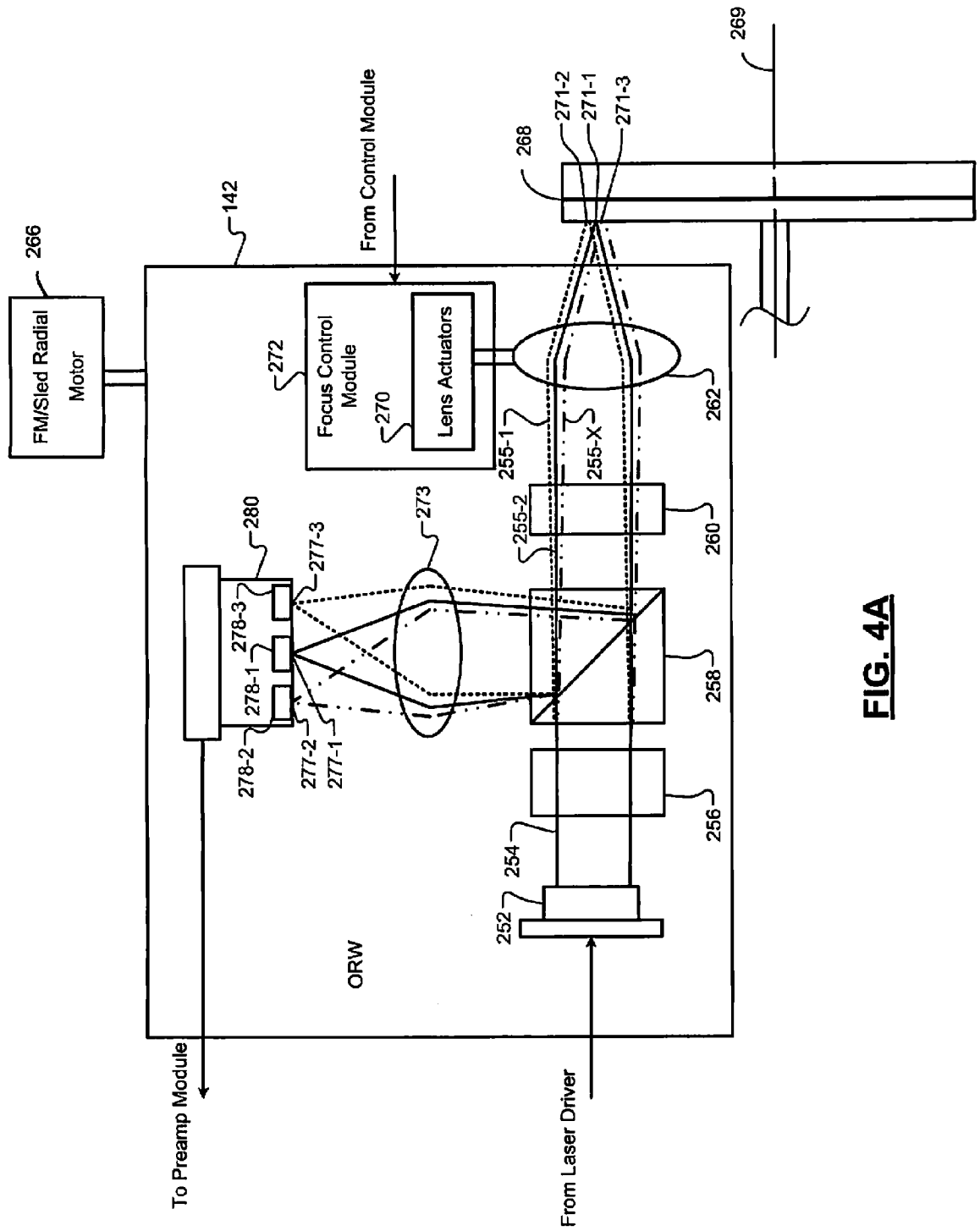
FIGS. 4A-4B are functional block diagrams of optical drive systems according to the present disclosure.

Referring now to FIG. 4A, an exemplary ORW 142 is illustrated. The ORW 142 may include a light source—e.g., a laser source 252, such as a laser diode, that emits a beam 254 (e.g., a laser beam). A collimator lens 256 collimates the laser beam 254. A polarizing beam splitter 258 diffracts the beam 254 into a plurality of beams 255-1, 255-2, . . . , and 255-X (referred to collectively as laser beams 255) of varying intensity. The beam having highest intensity may be referred to as a zeroth-order diffracted beam. The closest beams in terms of intensity may be referred to as first-order diffracted beams.

A quarter wave plate 260 receives the laser beams 255 from the beam splitter 258 and an objective lens 262 focuses the laser beams 255. Movement of the ORW 142 via a sled motor 266 may radially displace the laser beams 255 across tracks of an optical storage medium 268. The laser beams 255 are moved while the optical storage medium 268 is rotated about a spindle axis 269. Lens actuators 270 shape and focus the laser beams 255 by moving the objective lens 262 to form spots over the land/groove structures of the optical storage medium 268. Exemplary spots include a zeroth-order center spot 271-1 and two first-order satellite spots 271-2, 271-3 (collectively referred to as spots 271). A focus control module 272 may control the lens actuators 270 to adjust the objective lens 262 based on feedback signals from the control module 118 that indicate that the center spot 271-1 is not over a desired track.

Figure 4B:
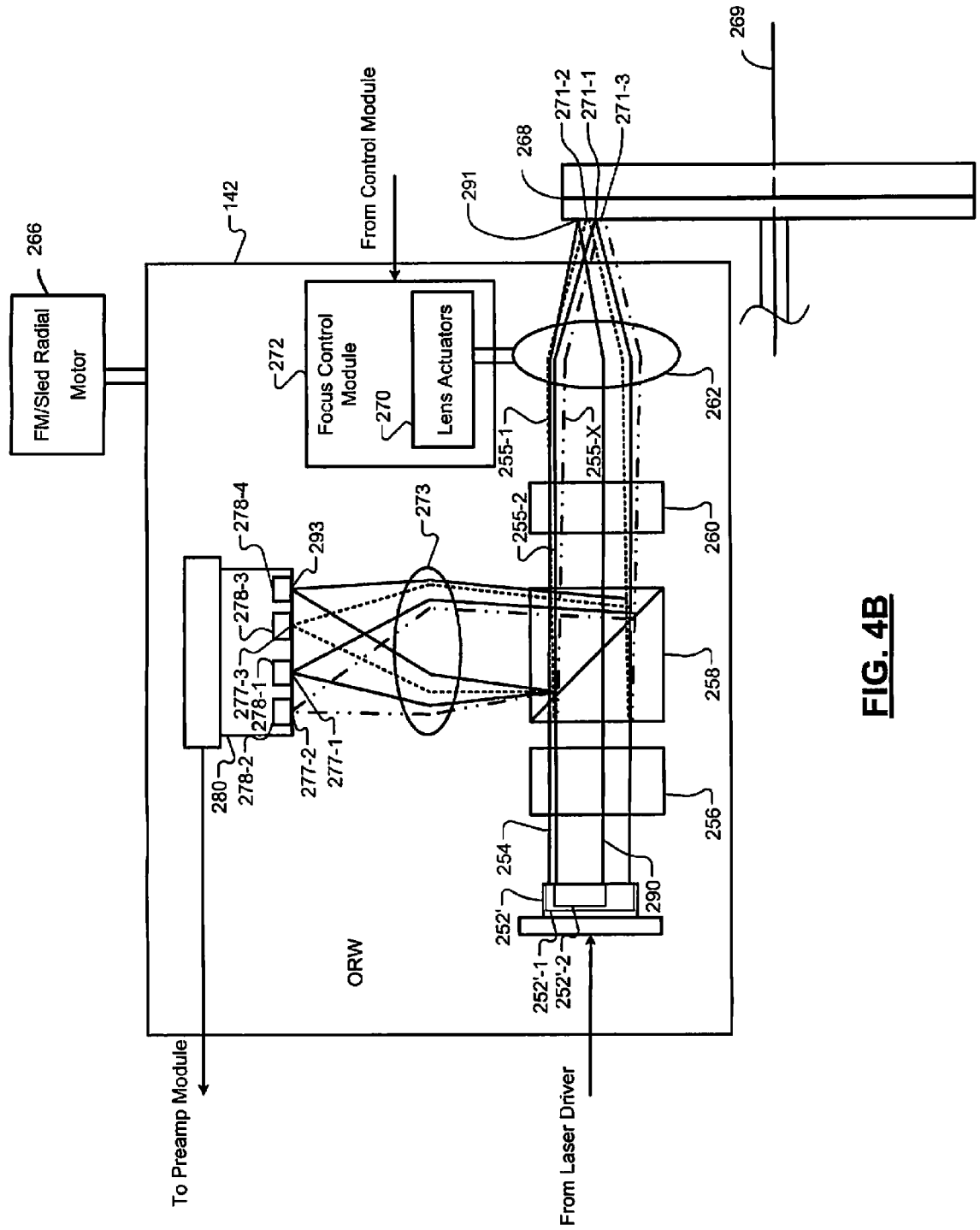

Referring now to FIG. 4B, multiple laser sources, generally indicated by laser sources 252', may be used. While a first of the laser sources 252'-1 may emit the beam 254, a second of the laser sources 252'-2 may emit a second beam 290 that is aimed at spot 291 on the optical storage medium 268. The second beam 290 may not be modulated with a write signal. The laser sources 252'-1, 252'-2 may have fixed positions relative to each other. For example, the second laser source 252'-2 may be affixed by an adhesive or otherwise mounted to the first laser source 252'-1. Therefore, when the first laser source 252'-1 is positioned over a current track, the laser source 252'-2 may be positioned over a previously written track, such as the prior track.

As data is written to the current track via the first laser source 252'-1, the second laser source 252'-2 may read data written to a prior track. Further, the laser sources 252'-1, 252'-2 may share components, such as the lenses 256-273. When sharing components, the beam splitter 258 may diffract the beam 290, however, only the central beam pointed at the spot 291 may be used for analyzing previously written data. Likewise, the sensor 278-4 may only detect the central beam reflected from the spot 291. In another embodiment, the laser sources 252'-1, 252'-2 may each use a different set of lenses to focus and/or diffract the laser beam 290.

Figure 5A:
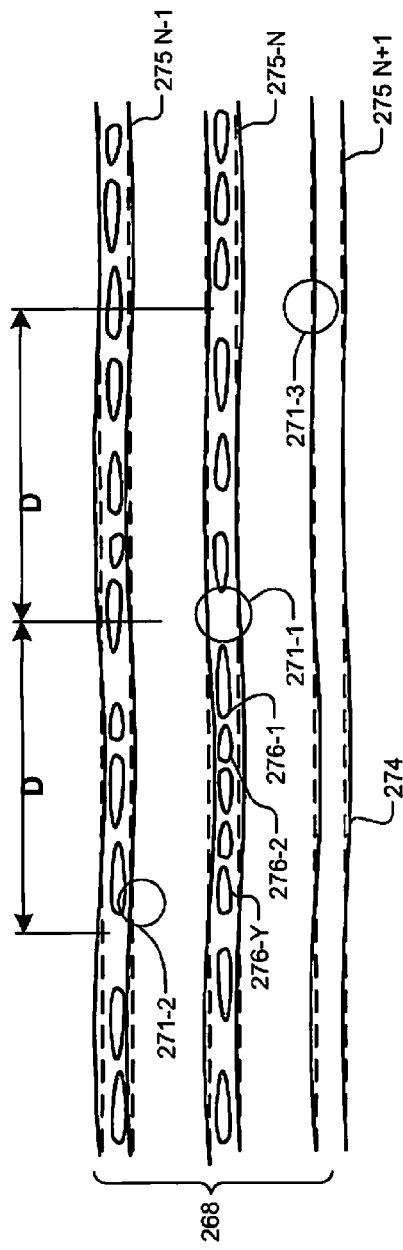
FIGS. 5A-5C are partial top views of an optical data storage medium according to the present disclosure.
Figure 5B:
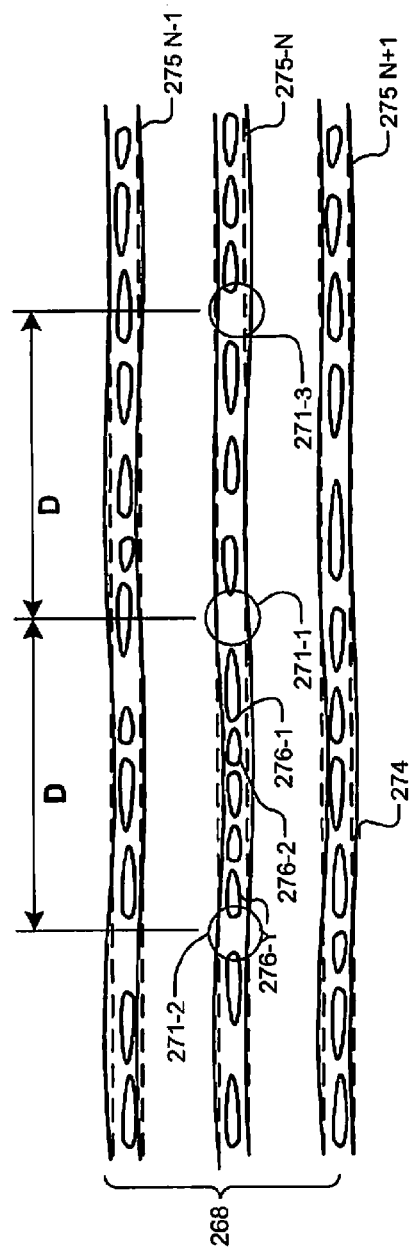
Figure 5C:
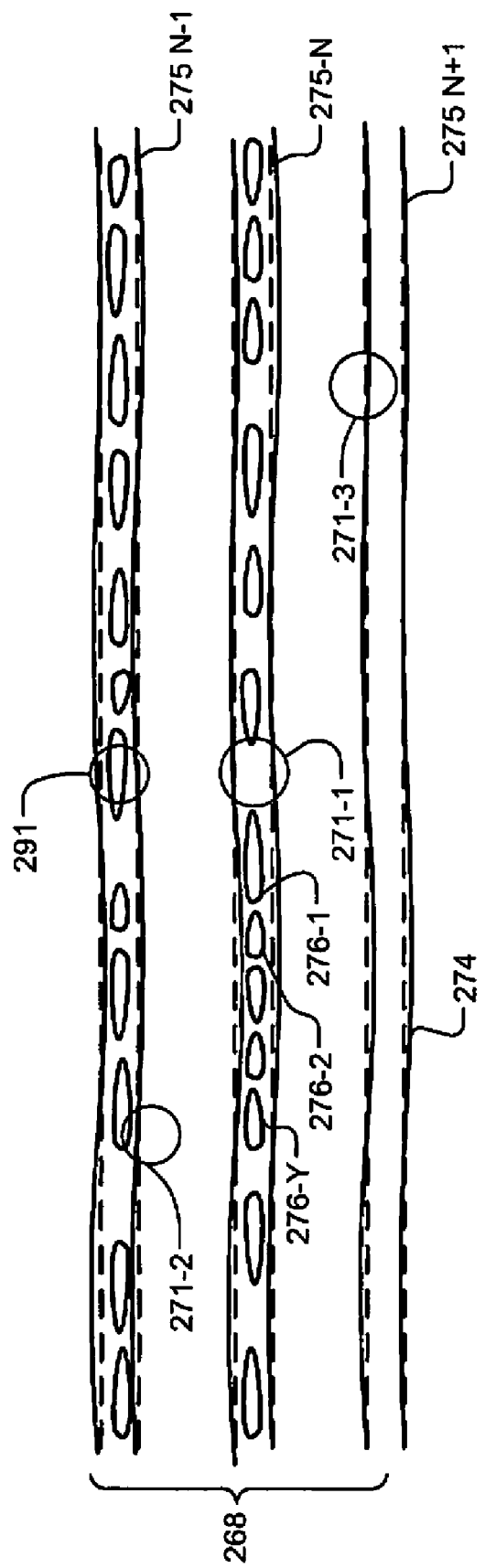

Referring now to FIGS. 5A-5C a partial top view of the optical storage medium 268 is illustrated. The optical storage medium 268 includes preformatted guide grooves 274 that may wobble around center lines 275-N, 275-N+1, 275 N-1 (collectively referred to as center lines 275). The center lines 275 represent locations for edges of the guide grooves 274 if the guide grooves 274 did not wobble. The center lines 275-N, 275-N+1, 275 N-1 may correspond to a current track, a track to be written, and a previously written track, respectively.

The ORW 142 writes data at the center spot 271-1 along the guide grooves 274 in the form of pits 276-1, 276-2, . . . , and 276-Y (referred to collectively as pits 276) as the optical storage medium 268 rotates about an axis. The pits 276 may follow the center lines 275 and may be written one at a time.

The spots 271 may be aligned in a straight line at an angle to the center lines 275, as shown in FIG. 5A. The center spot 271-1 may be disposed a predetermined distance D from each of the satellite spots 271-2, 271-3, respectively. The center spot 271-1 may follow the center line 275-N during writing of the optical storage medium 268. The satellite spots 271-2, 271-3 may overlap the center lines 275-N+1, 275 N-1, respectively. Alternatively, the spots 271 may be aligned along one of the center lines 275, as shown in FIG. 5B. Further, the secondary laser spot 291 may be disposed anywhere on the optical storage medium 268. For example, the secondary spot may be directly aimed at the previously written track 275 N-1, as in FIG. 5C.

The control module 118 may use the satellite spots 271-2, 271-3 and/or the secondary laser spot 291 to adjust the location of the center spot 271-1 so that the center spot 271-1 tracks the center line 275-N. Further, the control module 118 may detect previously written pits based on reflected laser light from the satellite spot 271-2 and or the secondary laser spot 291. The previously written pits may be along the center line 275-N of the current track and/or along the center line 275-N-1 of the previously written track.

In FIG. 4A, the beam splitter 258 of the ORW 142 receives light reflected off the optical storage medium 268 at the spots 271, 291. An astigmatic focus lens 273 then focuses the reflected light into spots 277-1, 277-2, 277-3, 277-4 (collectively referred to as spots 277) over sensors 278-1, 278-2, 278-3, 278-4 (collectively referred to as sensors 278), respectively. A photo-detector integrated circuit (PDIC) 279 may include the sensors 278. In one embodiment, the sensors 278 include photodiodes. The PDIC 279 converts the light from the spots 277 into electrical signals. Although not shown, additional photo-sensors may be used to detect other diffracted light beams (not shown).

Referring back to FIG. 3, during read operations, a laser driver 282 provides read power to the ORW 142. The ORW 142 detects data from the optical storage medium 119, and a preamplifier device 286 amplifies the detected data. The analog front-end module 140 receives amplified data from the preamplifier device 286 and performs such functions as filtering and A/D conversion. During write operations, the write strategy module 141 transmits power level and timing data to the laser driver 282. The laser driver 282 controls the ORW 142 to write data to the optical storage medium 119 in accordance with the power level and timing data provided by the write strategy module 141.

Figure 6:
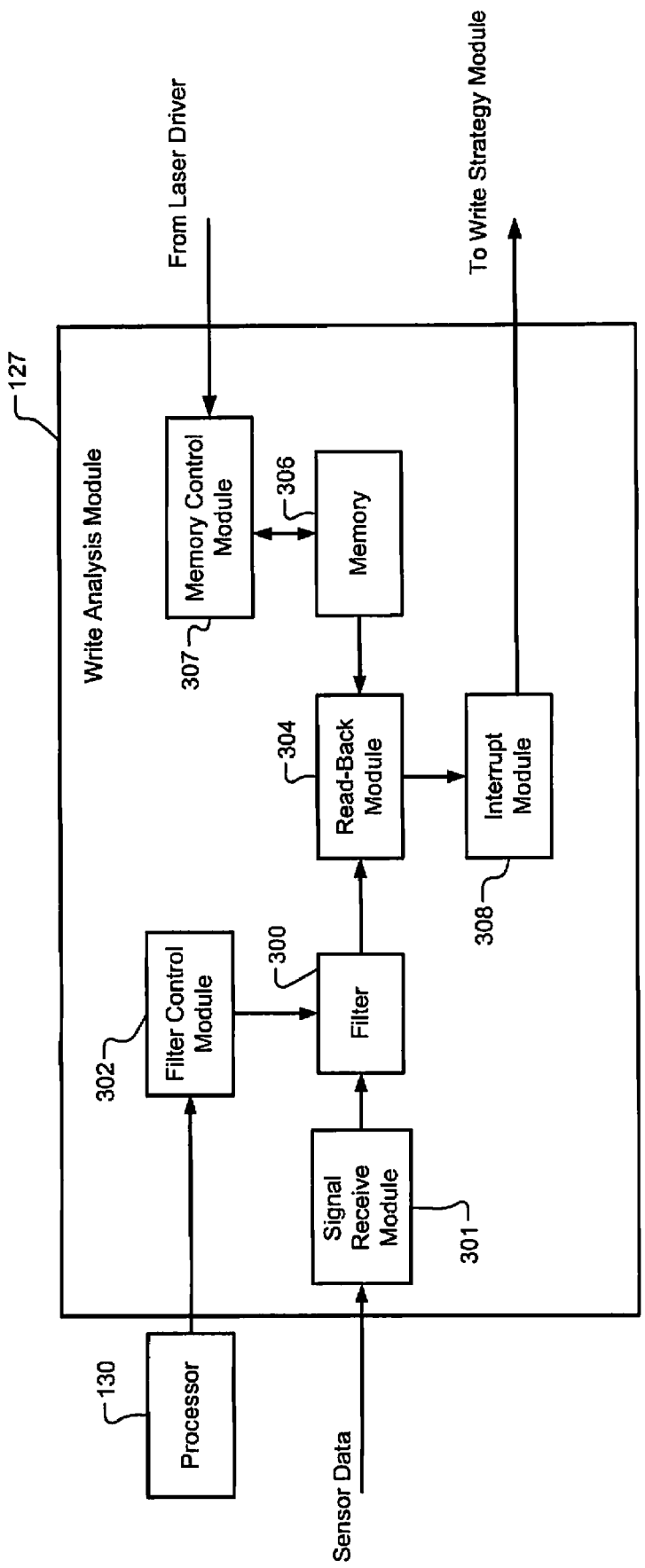
FIG. 6 is a functional block diagram of write analysis module according to the present disclosure.

Referring to FIG. 6, a functional block diagram of the write analysis module 127 is illustrated. The write analysis module 127 may receive and process signals from one or more of the sensors 278 (FIGS. 4A-4B) during a write operation. In one embodiment, a filter 300 (e.g., a high-pass filter, a band-pass filter, or a low pass filter) may filter signals from sensor 278-2 that provide data from the satellite spot 271-2. The signals may be received in a signal receive module 301. The data from the satellite spot 271-2 may include data from a pit that was written within the current centerline 275-N and/or data from a pit that was previously written within another centerline, such as centerline 275-N-1.

Because the satellite spot 271-2 also includes a lower-intensity, diffracted version of the current write signal, the filter 300 may be adapted to filter out the current write signal. For example, a filter control module 302 may receive the current write signal from the processor 130 and may adjust filtering characteristics of the filter 300 based on the current write signal. For example, The current write signal may be at a comparative high-frequency while other data from the sensor 278-2 may be at a lower frequency than that of the current write signal. The filter control module 302 may therefore control the filter 300 to filter out the high frequency (current write) portion of the signal while leaving the other sensor data substantially intact. A read-back module 304 may receive the filtered sensor signals.

In another embodiment, the read-back module 304 may receive unfiltered signals from sensor 278-4 that provide data from the spot 271-4 that corresponds to the secondary laser spot 291 on the optical storage medium 268. The read-back module 304 may receive the data via a receive module 301. The data from the spot 271-4 may include data from a pit that was written on a previous track.

The read-back module 304 may compare the filtered and/or unfiltered sensor signals to previously written data. For example, memory 306 may store timing data and/or power level data from the laser driver 282. A memory control module 307 may expunge data from the memory after the data has been present for a predetermined time, for example the time required to write to two or more tracks. The read-back module 304 may determine positions and/or size of pits that were written based on the timing data and/or power level data. For example, the timing data may indicate that a pit of size S was written at time T. Because the position of the satellite spot 271-2 and/or the secondary laser spot 291 may be fixed relative to the center spot 271-1, the read-back module 304 may determine the position of the satellite spot 271-2 based on the position of the center spot 271-1.

Therefore, the read-back module 304 may compare filtered and/or unfiltered signal data with a location that corresponds to time T and/or size S of a previously written pit. An interrupt module 308 may generate an interrupt if the signal data fails to indicate the presence of a written pit in a location that the written pit is expected. Further, the interrupt module 308 may generate an interrupt if a pit is detected, but the pit is smaller than the size of the written pit. For example, if the detected pit is less than a percentage (for example 10%) of the written pit in the filtered signal, the read-back module 304 may determine that the pit was not properly written.

Alternatively, the read-back module 304 may compare filtered signal data with data at least partially based on the pit. For example, the read-back module 304 may analyze the signal data to determine whether data that was written corresponds to the pit. The read-back module 304 may therefore detect one or more bits of the written data within the filtered or unfiltered signal data. If written bits are present, the read-back module 304 may determine that the pit has been correctly written. Otherwise, the read-back module 304 may interrupt writing operations to the optical storage medium 119 via the interrupt module 308. Further, the interrupt module 308 may generate an interrupt if the memory 306 reaches full capacity.

Figure 7:
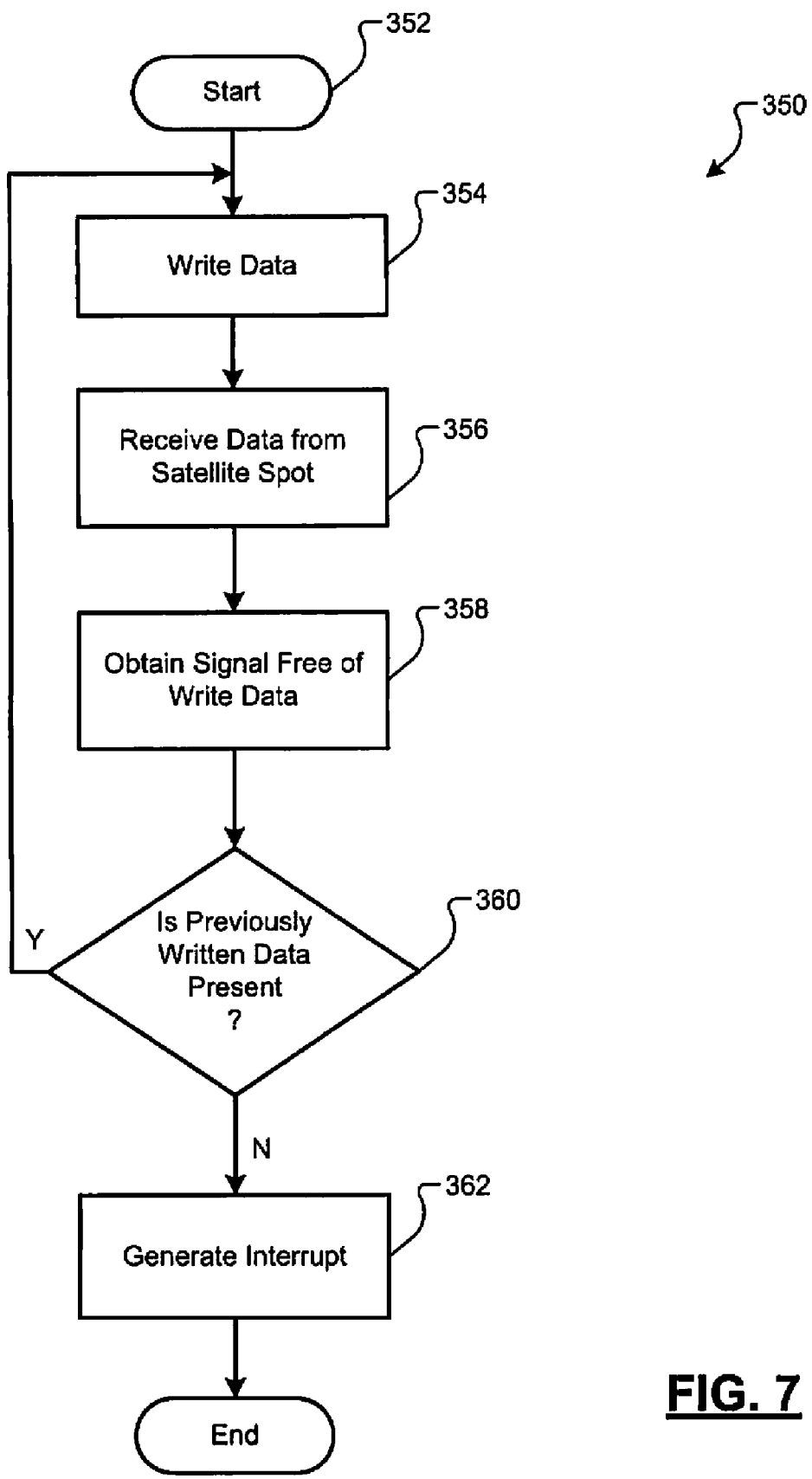
FIG. 7 is a logic flow diagram illustrating a method of operating an optical drive according to the present disclosure.

Referring to FIG. 7, a flow diagram 350 illustrating a method of operating an optical drive is illustrated. Control starts in step 352. In step 354, data is written to the optical storage medium 119 at a location of the central spot 271-1. In step 356, the write analysis module 127 receives data from the ORW 142 that corresponds to data from the satellite spot 271-2 and/or data from the secondary laser spot 291. In step 358, the write analysis module 127 obtains a signal that is free of the modulated write signal. The signal may be filtered to remove the write signal or the signal may have been generated without the write signal modulation.

In step 360, the write analysis module 127 determines whether the remaining data corresponds to data that was previously written (i.e. written before the current write data). The data may correspond to previously written data if the data provides an indication that data previously written at a particular location on the optical storage medium 119 is present. The data may also correspond to previously written data if the data substantially corresponds in size to data previously written at a particular location on the optical storage medium 119. The data may also correspond to previously written data if the data includes at least a portion of the written data. If step 360 is false, in step 362 the write analysis module 127 generates an interrupt.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A write analysis module for an optical drive, the optical drive including an optical storage medium, the write analysis module comprising:
a signal receive module configured to receive one or more signals corresponding to light reflected from the optical storage medium, wherein the light reflected from the optical storage medium is modulated with both i) data currently being written to the optical storage medium and ii) data previously written to the optical storage medium;
a filter configured to
receive the one or more signals corresponding to the light reflected from the optical storage medium, and
generate a filtered signal by filtering the one or more signals in accordance with a filtering characteristic of the filter; and
a filter control module configured to
receive a current write signal corresponding to the data currently being written to the optical storage medium, and
adjust the filtering characteristic of the filter based on the current write signal so that i) the filtered signal substantially contains only the data previously written to the optical storage medium and not the data currently being written to the optical storage medium; and
a read-back module configured to compare the filtered signal to data intended to have been previously written to the optical storage medium.

2. The write analysis module of claim 1, wherein the light reflected from the optical storage medium comprises a reflection of a diffracted laser beam.

3. The write analysis module of claim 1, wherein:
a first track of the optical storage medium contains the data currently being written to the optical storage medium; and
a second track of the optical storage medium contains the data previously written to the optical storage medium, wherein the second track has a different centerline than the first track.

4. The write analysis module of claim 1, further comprising memory configured to store at least one of timing data and power level data, wherein the at least one of timing data and power level data is associated with the data intended to have been previously written to the optical storage medium.

5. The write analysis module of claim 4, further comprising a memory control module configured to expunge the at least one of the timing data and the power level data from the memory after having stored the at least one of the timing data and the power level data for a predetermined amount of time.

6. The write analysis module of claim 1, wherein the read-back module is configured to determine at least one of position and size of pits on the optical storage medium that correspond to the data previously written to the optical storage medium.

7. The write analysis module of claim 1, further comprising an interrupt module configured to generate an interrupt in response to the filtered signal not corresponding to the data intended to have been previously written to the optical storage medium.

8. An optical drive comprising:
the write analysis module of claim 1; and
an optical read/write assembly in communication with the write analysis module, wherein the optical read/write assembly includes a laser to emit the light being reflected from the optical storage medium.

9. The optical drive of claim 8, wherein the optical read/write assembly includes a beam splitter configured to diffract the light being emitted from the laser into multiple diffracted laser beams.

10. The write analysis module of claim 1, wherein the optical storage medium comprises at least one of a compact disc, a digital versatile/video disc, or a high definition optical disc.

11. A method of operating a write analysis module for an optical drive, the optical drive including an optical storage medium, the method comprising:
receiving one or more signals corresponding to light reflected from the optical storage medium, wherein the light reflected from the optical storage medium is modulated with both i) data currently being written to the optical storage medium and ii) data previously written to the optical storage medium;

generating a filtered signal by filtering the one or more signals in accordance with a filtering characteristic of a filter;

adjusting the filtering characteristic of the filter so that i) the filtered signal substantially contains only the data previously written to the optical storage medium and not the data currently being written to the optical storage medium; and comparing the filtered signal to data intended to have been previously written to the optical storage medium.

12. The method of claim 11, wherein the optical storage medium comprises at least one of a compact disc, a digital versatile/video disc, or a high definition optical disc.

* * * * *